United States Patent
Barbiero et al.

(10) Patent No.: US 9,244,872 B2
(45) Date of Patent: Jan. 26, 2016

(54) CONFIGURABLE COMMUNICATIONS CONTROLLER

(71) Applicant: ATI Technologies ULC, Markham (CA)

(72) Inventors: Natale Barbiero, Toronto (CA); Gordon Caruk, Brampton (CA)

(73) Assignee: ATI TECHNOLOGIES ULC, Markham (CA)

( * ) Notice: Subject to any disclaimer, the term of this patent is extended or adjusted under 35 U.S.C. 154(b) by 445 days.

(21) Appl. No.: 13/723,960

(22) Filed: Dec. 21, 2012

(65) Prior Publication Data

US 2014/0181355 A1   Jun. 26, 2014

(51) Int. Cl.
*G06F 13/40* (2006.01)

(52) U.S. Cl.
CPC ........ *G06F 13/4022* (2013.01); *G06F 13/4027* (2013.01); *G06F 2213/0026* (2013.01)

(58) Field of Classification Search
CPC .................................................. G06F 13/4018
USPC ..................................... 710/66, 307; 341/100
See application file for complete search history.

(56) References Cited

U.S. PATENT DOCUMENTS

| | | | | |
|---|---|---|---|---|
| 5,055,661 A | * | 10/1991 | Gochi | 235/492 |
| 5,321,400 A | * | 6/1994 | Sasaki et al. | 341/100 |
| 5,388,227 A | | 2/1995 | McFarland | |
| 5,553,302 A | | 9/1996 | Morrissey et al. | |
| 5,610,903 A | | 3/1997 | Crayford | |
| 5,761,456 A | * | 6/1998 | Titus et al. | 710/305 |
| 5,982,309 A | * | 11/1999 | Xi et al. | 341/101 |
| 6,101,567 A | * | 8/2000 | Kim et al. | 710/305 |
| 6,128,681 A | * | 10/2000 | Shephard | 710/71 |
| 6,970,013 B1 | * | 11/2005 | Cory | 326/38 |
| 7,089,444 B1 | * | 8/2006 | Asaduzzaman et al. | 713/600 |
| 7,154,905 B2 | | 12/2006 | Shin et al. | |
| 2002/0107962 A1 | | 8/2002 | Richter et al. | |
| 2009/0103389 A1 | * | 4/2009 | Kajigaya | 365/230.03 |
| 2009/0271140 A1 | * | 10/2009 | Tashiro | 702/120 |
| 2010/0250872 A1 | * | 9/2010 | Ohhashi et al. | 711/154 |
| 2012/0079156 A1 | * | 3/2012 | Safranek et al. | 710/305 |
| 2012/0166701 A1 | * | 6/2012 | Oh et al. | 710/315 |

OTHER PUBLICATIONS

International Search Report and Written Opinion of International Application No. PCT/CA2013/050987, mailed Apr. 17, 2014, 8 pages.

* cited by examiner

*Primary Examiner* — Paul R Myers
(74) *Attorney, Agent, or Firm* — Polansky & Associates, P.L.L.C.; Paul J. Polansky

(57) ABSTRACT

A communications controller includes a physical interface and an internal transmit and receive circuit. The physical interface has a port for connection to a communication medium, an input, and an output, and operates to receive a first sequence of data bits from the input and to transmit the first sequence of data bits to the port, and to receive a second sequence of data bits from the port and to conduct said second sequence of data bits to the output. The internal transmit and receive circuit is coupled to the physical interface, and has an internal architecture to conduct a first plurality of symbols at a first rate in a low frequency mode and a second plurality of symbols at a second rate in a low latency mode, wherein the first plurality is greater in number than the second plurality, and the second rate is higher than the first rate.

39 Claims, 7 Drawing Sheets ns controller.

CONFIGURABLE COMMUNICATIONS CONTROLLER

FIELD

This disclosure relates generally to communications controllers, and more specifically to configurable communications controllers.

BACKGROUND

Various communications protocols support a physical interface connected to a communication medium, and operate according to a protocol. For example, the PCI Express (PCIE) standard describes certain protocols for such communications. The PCIE standard is an extension of the PCI standard that uses existing PCI programming concepts. According to the PCIE standard, packets are transferred between various PCIE compatible requesters and completers of a PCIE compatible system. As is known, the PCIE standard describes a link as the collection of two ports and their interconnecting lanes and the link is a dual-simplex communications path between two components. The PCIE standard further describes a lane as a set of differential signal pairs, one pair for transmission and one pair for reception, where a by-N link is composed of N lanes. For example, a by-16 link operating at a 2.5 Giga transfers per second (GT/s) data rate represents an aggregate raw bandwidth of 40 Gigabits/second in each direction. The PCIE standard describes operations for by-1, by-2, by-4, by-8, by-12, by-16, and by-32 links.

The PCIE standard describes a symbol as a 10-bit quantity using 8 bit (b)/10b encoding (8 bits encoded as 10 bits), and an 8-bit quantity using 128b/130b encoding (2 bits of Sync Header and 128 bits of payload). The PCIE standard also describes the symbol time as the period of time to place a symbol on a lane (10 times a unit interval when using 8b/10b encoding, and 8 times a unit interval when using 128b/130b encoding). The PCIE standard further describes the unit interval as the value measured by averaging the time interval per bit, over a time interval long enough to make all intentional frequency modulation of the source clock negligible.

Once a PCIE compatible system initializes each link, the link operates at one of the supported data rates. The PCIE 1.0a standard specifies an effective data rate of 2.5 Gigabits per second, per lane, per direction, of raw bandwidth. The PCIE 2.0 standard specifies an effective data rate of 5.0 Gigabits per second, per lane, per direction, of raw bandwidth. The PCIE 3.0 standard specifies an effective data rate of 8.0 Gigabits per second, per lane, per direction, of raw bandwidth. Also, the future PCIE 4.0 standard is expected to specify an effective data rate of 16.0 Gigabits per second, per lane, per direction, of raw bandwidth. Future versions of the PCIE standard will likely continue to increase the specified data rate. For example, historically the PCIE standard has doubled the PCIE bandwidth for each major revision (generally every 3-4 years).

As communication standards such as the PCIE standard continue to specify increasing data rates, the design of the associated communication controllers will become increasingly difficult.

Figure 1:
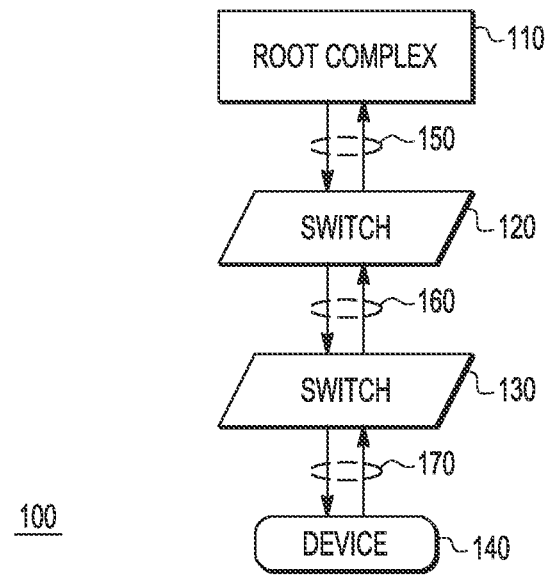
FIG. 1 illustrates in block diagram form a communications fabric according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A communications controller generally includes a receive circuit and a transmit circuit connected between a client interface and a physical interface. The communications controller has a port for connection to a communication medium, and operates according to a protocol, for example the PCIE standard protocol, that uses a sequence of data bits to form symbols. PCIE symbols may be formed using either an 8b/10b encoding scheme or a 128b/130b encoding scheme. The port connects to a link having, for example, up to sixteen PCIE data lanes, although the largest supported link width varies in different embodiments.

In some embodiments, a communications controller as disclosed below includes a deserializer having an input connected to the output of the physical interface, and an output for providing, in response to a sequence of data bits, a first multiple number of data bits at a first rate in a low frequency mode and a second multiple number of data bits at a second rate in a low latency mode, where the first multiple number is greater in number than the second multiple number, and the second rate is higher than the first rate. The communications controller also has a receive block having an input connected to the output of the deserializer. In some embodiments, the communications controller includes a transmit block having an input and an output for providing a sequence of multiple symbols. The communications controller also has a serializer having an input connected to the output of the transmit block, and an output for providing, in response to the sequence of the multiple symbols, a first multiple number of data bits at a first rate in a low frequency mode and a second multiple number of data bits at a second rate in a low latency mode, where the first multiple number is greater in number than the second multiple number, and the second rate is higher than the first rate. In some embodiments, the communications controller includes a control block such as a link controller that has at least one mode register for selecting one of the low frequency mode and the low latency mode.

Thus, a communications controller can dynamically alter its internal architecture to respond more appropriately to the needs of different design constraints. In addition, a communications controller originally designed for one standard (such as PCIE 3.0) can be easily adapted for a new, higher speed standard (such as PCIE 4.0) without re-architecting it.

FIG. 1 illustrates in block diagram form a communications fabric 100 according to some embodiments. For example, communications fabric 100 can be a PCIE compatible fabric composed of point-to-point links that interconnect a set of PCIE compatible components and the following discussion will describe communications fabric 100 in the context of PCIE. It should be appreciated that in some embodiments, communications fabric 100 could operate according to other communication bus protocols, for example the HyperTransport (HT) protocol. Communications fabric 100 generally includes a root complex 110, a switch 120, a switch 130, a device 140, a link 150, a link 160, and a link 170. Each of switches 120 and 130 includes at least one PCIE bridge (not shown) and an additional port to connect to, for example, other PCIE compatible devices (not shown), over respective links.

Root complex 110 has a root ingress port and a root egress port, respectively, connected to the upstream port of switch 120, and switch 120 has a downstream port connected to an upstream port of switch 130. Switch 130 has a downstream port connected to an ingress port and an egress port of device 140. Root complex 110, switch 120, switch 130, and device 140 each conduct signals over corresponding ones of links 150, 160, and 170. Links 150, 160, and 170 are each dual unidirectional links to conduct data bits in packets between components of fabric 100, and the principles disclosed herein apply to any supported link width.

In operation, during a PCIE hardware initialization process, agents of communications fabric 100 (root complex 110, switches 120 and 130, and device 140) initiate parameters of links 150, 160, and 170, by "negotiating" the lane widths and link frequency of operation (link speed). At the physical layer, which is the layer that directly interacts with the communication medium between PCIE agents, the agents begin the negotiation process by initiating link training to determine link data rate capability of each agent, lane ordering within a link, link width, and lane-to-lane de-skew to reassemble packets that were striped across lanes within a multi-lane link. The PCIE agents begin the training process by operating at a PCIE 1.0a architecture data rate of 2.5 GT/s on each lane so that all agents along the link have the capability to communicate with each other. Device 140, for example, advertises its data rate capability by providing a PCIE "Ordered Set" training field to other PCIE agents.

At the completion of the negotiation process, the agents on the link decide whether to keep the data rate at 2.5 GT/s to accommodate a particular PCIE agent. Also, the agents on the link could transition to a PCIE "Recovery state" to change the data rate, for example, to a PCIE 3.0 rate of 8.0 GT/s, or to an anticipated PCIE 4.0 rate of 16.0 GT/s. During the negotiation process, agents also agree to values for the link number and lane number for each lane that is part of a valid link.

Once the PCIE link speed and width parameters are established, root complex 110 will generally begin transactions on the link. For example, root complex 110 performs a programmed I/O transaction by operating as a PCIE compatible requester to send request Transaction Layer Packets (TLPs) to device 140. In response, device 140 functions as a PCIE compatible completer to provide the response packets known as completions. Alternately for some transactions, such as memory transactions, device 140 has the capability to function as a PCIE compatible requester, and root complex 110 has the capability to function as a PCIE compatible completer.

Figure 2:
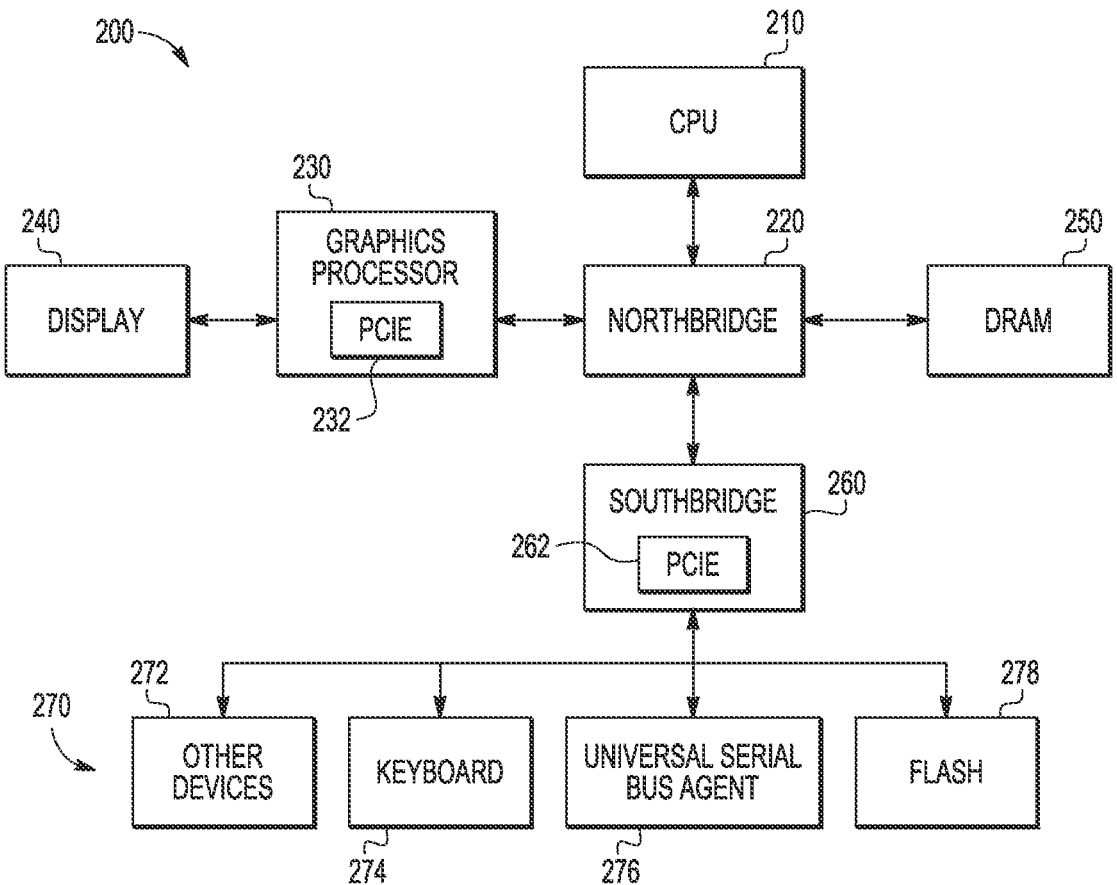
FIG. 2 illustrates in block diagram form a computer system according to some embodiments.

FIG. 2 illustrates in block diagram form a computer system 200 according to some embodiments. In the example shown in FIG. 2, computer system 200 is a PCIE compatible computer system, which is capable of executing processor-readable instructions. Computer system 200 generally includes a central processing unit (CPU) 210, a bridge controller known as a "northbridge" 220, a graphics processor 230, a display 240, a dynamic random access memory (DRAM) 250, a bridge controller known as a "southbridge" 260, and a set of peripherals 270 including a set of other devices 272, a keyboard 274, a universal serial bus agent 276, and a Flash memory 278. Graphics processor 230 includes a PCIE controller 232 and southbridge 260 includes a PCIE controller 262.

CPU 210 and northbridge 220 conduct a variety of signals including addresses, data, control signals, interrupt signals, exception signals, and the like. Northbridge 220 is connected to graphics processor 230. Graphics processor 230 is connected to display 240 to provide visual data to a user. Northbridge 220 is also connected to DRAM 250.

Southbridge 260 and northbridge 220 conduct a variety of signals relevant to their operational states such as, for example, a set of power management signals or signals related to PCIE controller 262. PCIE controller 262 also conducts streams of data bits between certain PCIE compatible peripherals 270 over a PCIE link. Southbridge 260 typically includes a legacy PCI controller (not shown) to communicate with legacy devices.

In operation, PCIE controller 232 and PCIE controller 262 interact with different PCIE agents having unique demands. For example, PCIE controller 232 conducts packets over the PCIE link that are used to render graphics vertices and textures, using parallel processing techniques and high bandwidth transactions. These transactions are streamlined for needed throughput (e.g. frame rate), image quality (e.g. anti-aliasing), compatibility with other graphics circuits (not shown), and overall flexibility (e.g. driving a multiple number of displays 240). For other operations, PCIE controller 232 conducts packets over the PCIE link to process commands, using a combination of low frequency and low latency transactions. For such transactions, PCIE controller 232 moves data between graphics processor 230, northbridge 220, CPU 210, and DRAM 250. For example, CPU 210 runs applications that demand low latency access to resources of graphics processor 230, to perform general purpose computing and to assist graphics processor 230 with certain operations. PCIE controller 232 operates on a PCIE interface that can be negotiated to 16 lanes, conducting some data at 2.5 GT/s, but most data at 8.0 GT/s, and in the near future at 16.0 GT/s.

Figure 3:
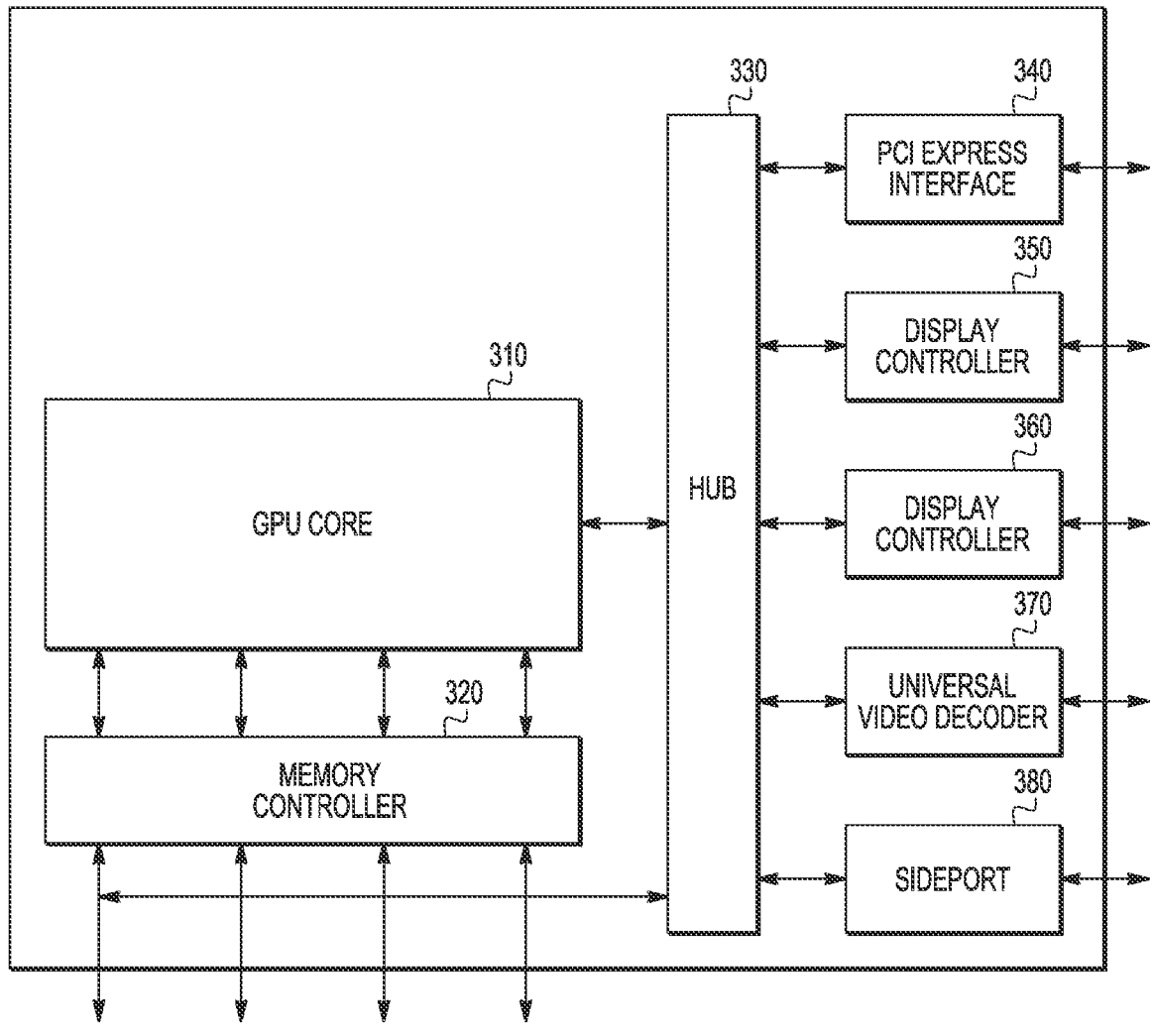
FIG. 3 illustrates in block diagram form a graphics processor that may be used to implement the graphics processor of FIG. 2 according to some embodiments.

FIG. 3 illustrates in block diagram form a graphics processor 300 that may be used to implement graphics processor 230 of FIG. 2 according to some embodiments. In the example shown in FIG. 3, graphics processor 300 is a single-chip graphics processing unit (GPU), which generally includes a GPU core 310, a memory controller 320, a Hub 330, a PCIE interface 340, a display controller 350, a display controller 360, a universal video decoder 370, and a sideport 380.

GPU core 310 is connected to memory controller 320 to conduct multiple sets of signals for corresponding memory buses, and memory controller 320 is connected to external memory (not shown). Hub 330 interconnects memory controller 320, GPU core 310, PCIE interface 340, display controllers 350 and 360, universal video decoder 370, and sideport 380. PCIE interface 340 conducts streams of high bandwidth and low latency data bits between, for example, northbridge 220 and CPU 210, over a dedicated PCI Express link. Display controllers 350 and 360, universal video decoder 370, and sideport 380 each have bidirectional ports connected to bidirectional ports of their respective peripherals (not shown), to conduct a set of control and data signals over corresponding busses.

In operation, GPU 300 processes a large amount of graphics data using several internal processing engines each of which can be a client to PCIE controller 340. Since it is highly pipelined, GPU 300 generally is not overly latency sensitive, although particular processing scenarios performed by GPU 300 may need to access data with low latency.

Figure 4:
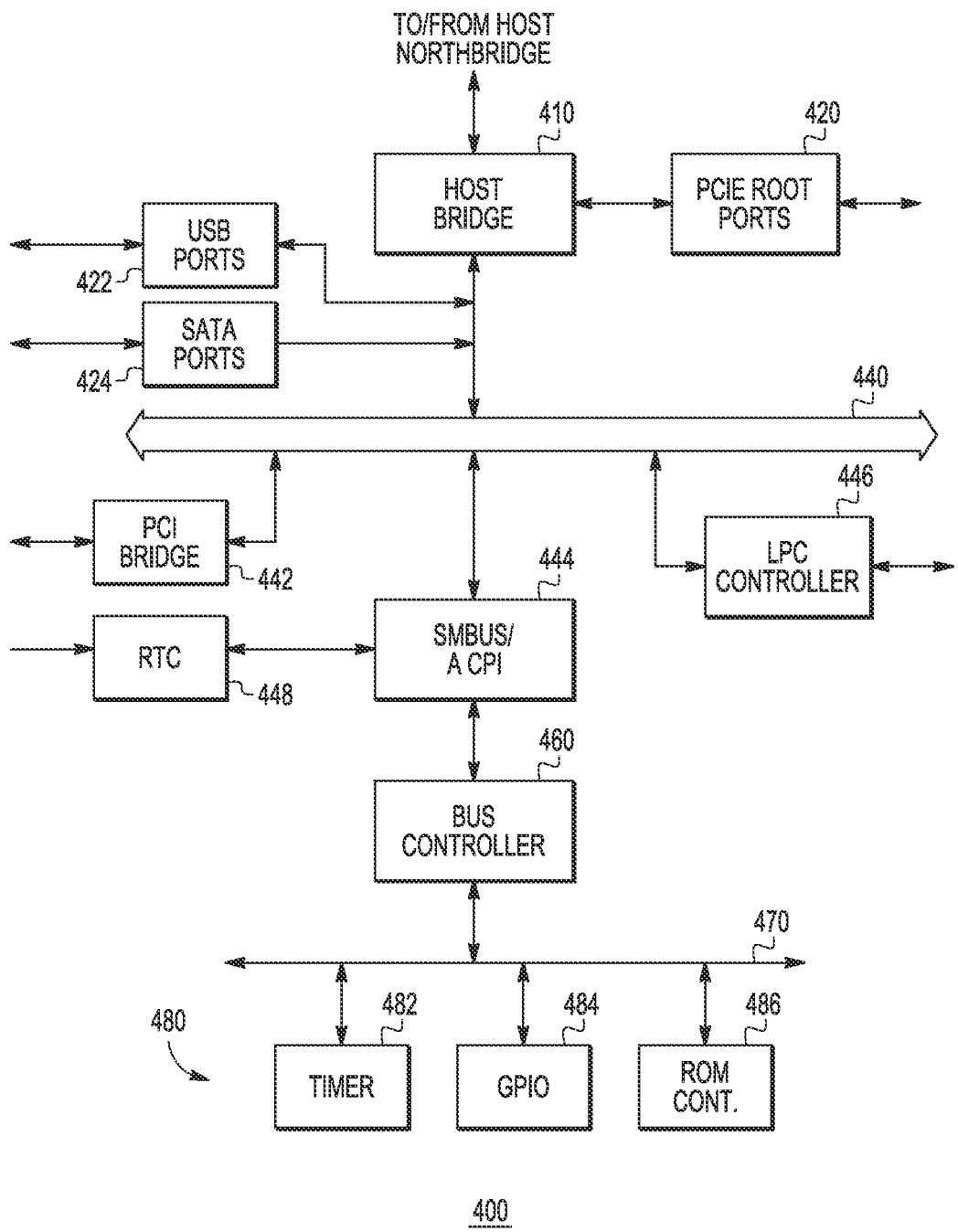
FIG. 4 illustrates in block diagram form a southbridge that may be used to implement the southbridge of FIG. 2 according to some embodiments.

FIG. 4 illustrates in block diagram form a southbridge 400 that may be used to implement southbridge 260 of FIG. 2 according to some embodiments. Southbridge 400 generally includes a host bridge 410, a set of PCIE root ports 420, a set of universal serial bus (USB) ports 422, a set of Serial Advanced Technology Attachment (SATA) ports 424, an internal bus 440, a PCI bridge 442, a system management bus (SMBUS)/Advanced Configuration and Power Interface (ACPI) controller 444, a low pin count (LPC) controller 446, a real time clock (RTC) 448, a bus controller 460, an internal bus 470, and a set of peripheral functions 480 including a timer 482, a general purpose input/output (GPIO) 484, and a read only memory (ROM) controller 486.

Host bridge 410 has a port on a host side connected to northbridge 220. Host bridge 410 is also connected to USB ports 422, SATA ports 424, PCIE root ports 420, and internal bus 440. USB ports 422 are able to connect to USB peripherals (not shown), each over a USB bus. SATA ports 424 are able to connect to SATA peripherals (not shown), each over a SATA bus. PCIE root ports 420 conduct signals to corresponding PCIE hierarchies, each over a PCIE link.

Internal bus 440 conducts signals between host bridge 410, PCI bridge 442, SMBUS/ACPI controller 444, and LPC controller 446. PCI bridge 442 has a bidirectional port able to connect to bidirectional ports of legacy PCI peripherals (not shown) over a PCI bus. LPC controller 446 has a bidirectional port able to connect to bidirectional ports of LPC peripherals (not shown) over an LPC bus. SMBUS/ACPI controller 444 is connected to RTC 448 and bus controller 460. RTC 448 has an input to receive a crystal oscillator clock signal. Bus controller 460 conducts signals with each one of peripheral functions 480 over internal bus 470.

In operation, southbridge 400 manages input/output, communications, and audio features for computer system 200 with lower speed and general purpose computer peripherals. Note that PCIE root ports 420 operate according to the description of PCIE controller 262 of FIG. 2. The example shown in FIG. 4 illustrates that various clients in computer system 200, each having its own requirements, can initiate and respond to PCIE accesses. For example, CPU 210 may request data that is needed before continuing to process instructions that are not present in either a cache or the memory system but are stored in a device connected to a PCIE fabric. Since CPU 210 might stall waiting for the data, it prefers to access its needed data with low latency.

Figure 5:
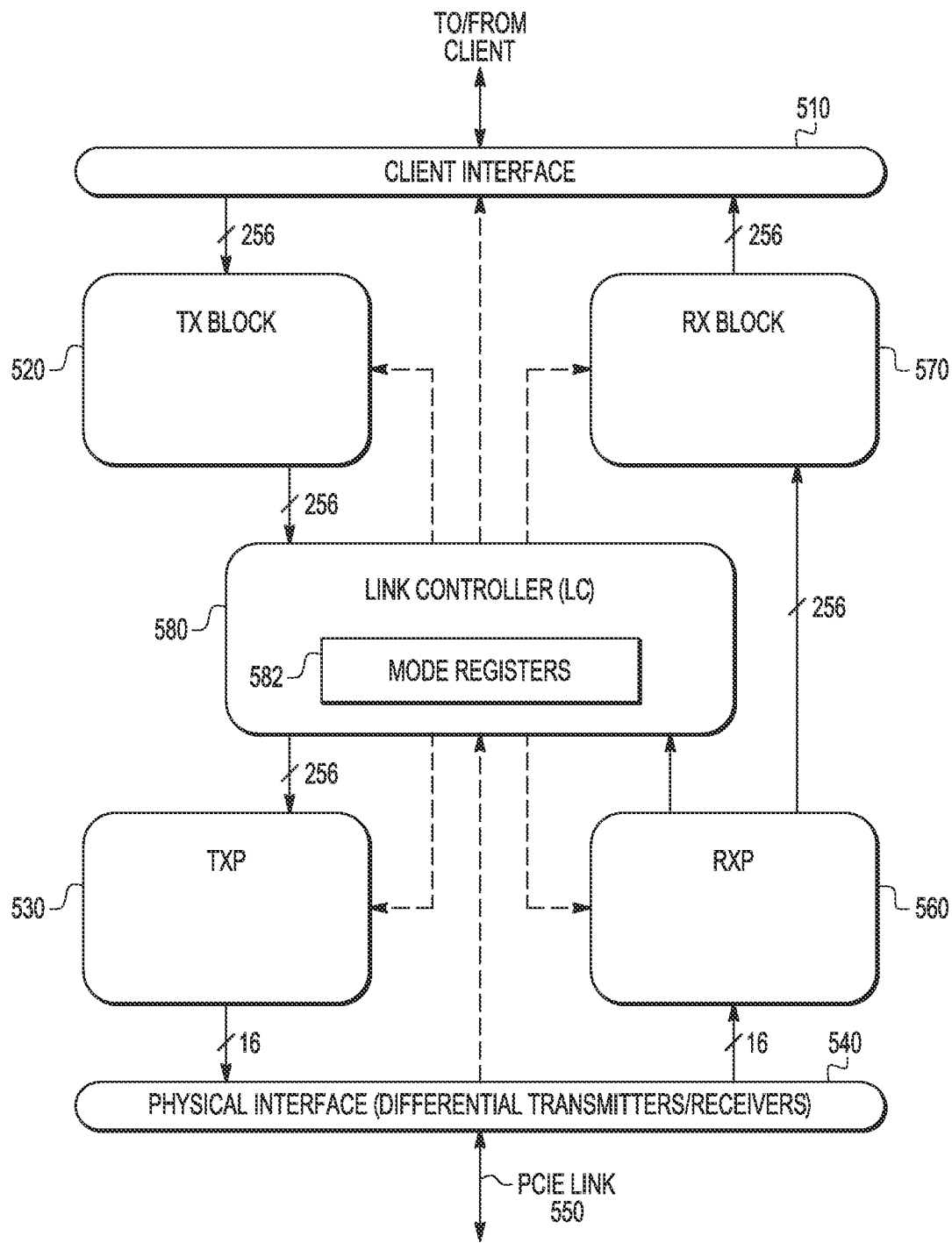
FIG. 5 illustrates in block diagram form a communications controller that may be used to implement either of the PCIE controllers of FIG. 2 according to some embodiments.

FIG. 5 illustrates in block diagram form a communications controller 500 that may be used to implement either of PCIE controllers 232 and 262 of FIG. 2 according to some embodiments. Communications controller 500 generally includes a client interface 510, a transmit ("TX") block 520, a serializer 530 labeled "TXP", a physical interface 540, a communication medium 550 labeled "PCIE LINK", a deserializer 560 labeled "RXP", a receive block ("RX") 570, and a link controller ("LC") 580 that includes a set of mode registers 582.

Client interface 510 has a port to connect to a port of a client, such as a client in graphics processor 230 or southbridge 260. Client interface 510 is also connected to transmit block 520 over a 256-bit data bus. Transmit block 520 has an output to provide a set of 256-bit transmit data signals, and an input to receive a set of control signals. Serializer 530 has an input to receive a set of 256-bit transmit data signals, an input to receive a set of control signals, and an output to provide a set of 16-bit transmit data signals.

Physical interface 540 has an input to receive the set of 16-bit transmit data signals from serializer 530, an input to receive a set of control signals, an output to provide a set of 16-bit receive data signals, and a port to conduct a set of data bits over communication medium 550. Physical interface 540 also has a set of outputs, not shown in FIG. 5, for providing clock signals to the various blocks based on the negotiated link speed and selected mode, as will be described below.

Deserializer 560 has an input to receive the set of 16-bit receive data signals from physical interface 540, an input to receive a set of control signals, an output to provide a set of special signals including, for example, PCIE ordered sets and electrical indicators (such as an indication that a PCIE device on the other end of the link is exiting an idle mode), and an output to provide a set of 256-bit receive data signals. Receive block 570 has an input to receive a set of control signals, and an input to receive the set of 256-bit receive data signals from deserializer 560, and is also connected to client interface 510 over a 256-bit data bus.

Link controller 580 has an input to receive the 256-bit transmit data signals from transmit block 520, an input to receive the set of special signals from deserializer 560, an output to provide the 256-bit transmit data signals to serializer 530, and outputs to provide respective control signals to client interface 510, transmit block 520, serializer 530, physical interface 540, deserializer 560, and receive block 570.

Communications controller 500 is designed to support existing PCIE standards as well as a next-generation standard after it is finalized without the need for re-architecture. In the example shown in FIG. 5, PCIE controller 500 supports ×1, ×2, ×4, ×8, ×12, and ×16 PCIE link widths. In some embodiments, a PCIE controller constructed according to the principles set forth herein can support different maximum PCIE link widths, including the widths listed above plus ×32 as described in the PCIE standard, or a maximum link width less than ×16. Moreover, communications controller 500 includes 256-bit wide internal buses, but may implement different internal bus sizes in different embodiments. Each revision of the PCIE Standard has described a new architectural version listed in TABLE I below (column 1). Each PCIE revision also describes a higher supported data rate than the previous version (column 2), and uses an associated data encoding scheme (column 3) at the supported data rate. Note that, for example, PCIE 1.0a and PCIE 2.0 use the 8b/10b encoding scheme, whereas PCIE 3.0 and 4.0 use the 128b/130b encoding scheme. For each increasing PCIE supported data rate, if the design frequency target of the functional circuits, such as transmit block 520, serializer 530, physical interface 540, deserializer 560, and receive block 570, was increased accordingly, they would require continual redesign to ensure proper internal timing.

In a low latency mode (column 4), communications controller 500 processes one symbol of PCIE data per PCIE lane at an actual frequency of operation using 128-bit internal data bus. In this mode, communications controller 500 reduces latency by processing less data at a time but at a higher processing rate. Thus, communications controller 500 is able to return data to a client over client interface 510 sooner.

In a low frequency mode (column 5), communications controller 500 processes two symbols of PCIE data per PCIE lane at an actual frequency of operation that is half the frequency used in the low latency mode, using a widened 256-bit, internal data bus.

TABLE I

| Revision of the PCIE Standard | Supported Data Rate | Data Encoding Scheme | Low Latency Mode Internal Transfers | Low Frequency Mode Internal Transfers |
|---|---|---|---|---|
| PCIE 1.0a | 2.5 GT/s | 8 b/10 b | 128 bits @ 250 MHz | 256 bits @ 125 MHz |
| PCIE 2.0 | 5.0 GT/s | 8 b/10 b | 128 bits @ 500 MHz | 256 bits @ 250 MHz |
| PCIE 3.0 | 8.0 GT/s | 128 b/130 b | 128 bits @ 1.0 GHz using 128 bits bus | 256 bits @ 500 MHz using 256 bits bus |
| PCIE 4.0 | 16.0 GT/s | 128 b/130 b | 128 bits @ 2.0 GHz using 128 bit bus | 256 bits @ 1.0 GHz using 256 bits bus |

Communications controller 500 increases flexibility by making both modes available. FIGS. 2-4 above describe various PCIE clients for which latency of transactions may be important (e.g., buffer miss transactions through a PCIE fabric whose requester is connected to a PCIe root port 420 in southbridge 260). In PCIE, latency is calculated from the time a PCIE compatible requester provides a request packet to the time a PCIE compatible completer provides an acknowledgement packet. Thus, latency increases with more levels of the PCIE fabric. Latency through the fixed length internal pipeline of a PCIE controller (230 or 262) is higher when running in low frequency mode processing two symbols per clock, where the clock is running at one half the rate of pipeline processing one symbol per clock. Alternatively, other PCIE clients exist for which latency is not as important and for which low frequency transactions processing is more desirable (e.g. for graphics processor 230) by saving power.

Moreover, communications controller 500 ensures compatibility with the emerging PCIE 4.0 standard without the need for re-architecture by expanding the bus width in the low frequency mode. Thus communications controller 500 has the capability to support all of the data rates shown in column 2 of TABLE I. For example, communications controller 500 supports both the low latency mode and the low frequency mode for the PCIE 3.0 data rate of 8.0 GT/s, allowing the computer system to choose the mode appropriate to the client, the PCIE fabric, and the speed of the technology the component is manufactured with. Communications controller 500 also supports the PCIE 4.0 data rate of 16.0 GT/s in the low frequency mode using the expanded internal bus size with a reasonable internal clock frequency. Operating in low frequency mode allows communications controller 500 to support the new PCIE 4.0 standard without running at a 2.0 GHz internal clock rate that, in some embodiments, it could not do without re-architecture. Thus communications controller 500 offers low latency modes for lower PCIE rates and easy migration of an already designed circuit block to the new PCIE 4.0 rate without re-architecture using a low frequency mode. Moreover communications controller 500 can change modes dynamically to fit the operating environment.

Adding the low frequency mode is accomplished by only a small increase in circuit area by duplicating small portions of control logic and doubling the size of the data paths. However the area penalty for this added control circuitry and expanded data path width is offset by avoiding the need for certain circuits that would be required to support higher frequency, such as clock repeaters, extra buffers, and the like, and by avoiding the need to increase the size of existing circuit macros required to meet timing at the higher clock rate.

In some embodiments, mode registers 582 select the low frequency mode or the low latency mode for communications controller 500 for each available link speed. In some embodiments, link controller 580 can change the mode during an idle time of the link when no transactions are in flight, for example during a PCIE Recovery Speed state while the lane is electrically idle, but in other embodiments link controller 580 can change the mode at any time. In some embodiments, other low frequency modes may be supported. For example, communications controller 500 could support a low frequency mode extended to four symbols per clock cycle with a 512-bit bus, and operating at a quarter of the speed used in low latency mode.

Figure 6:
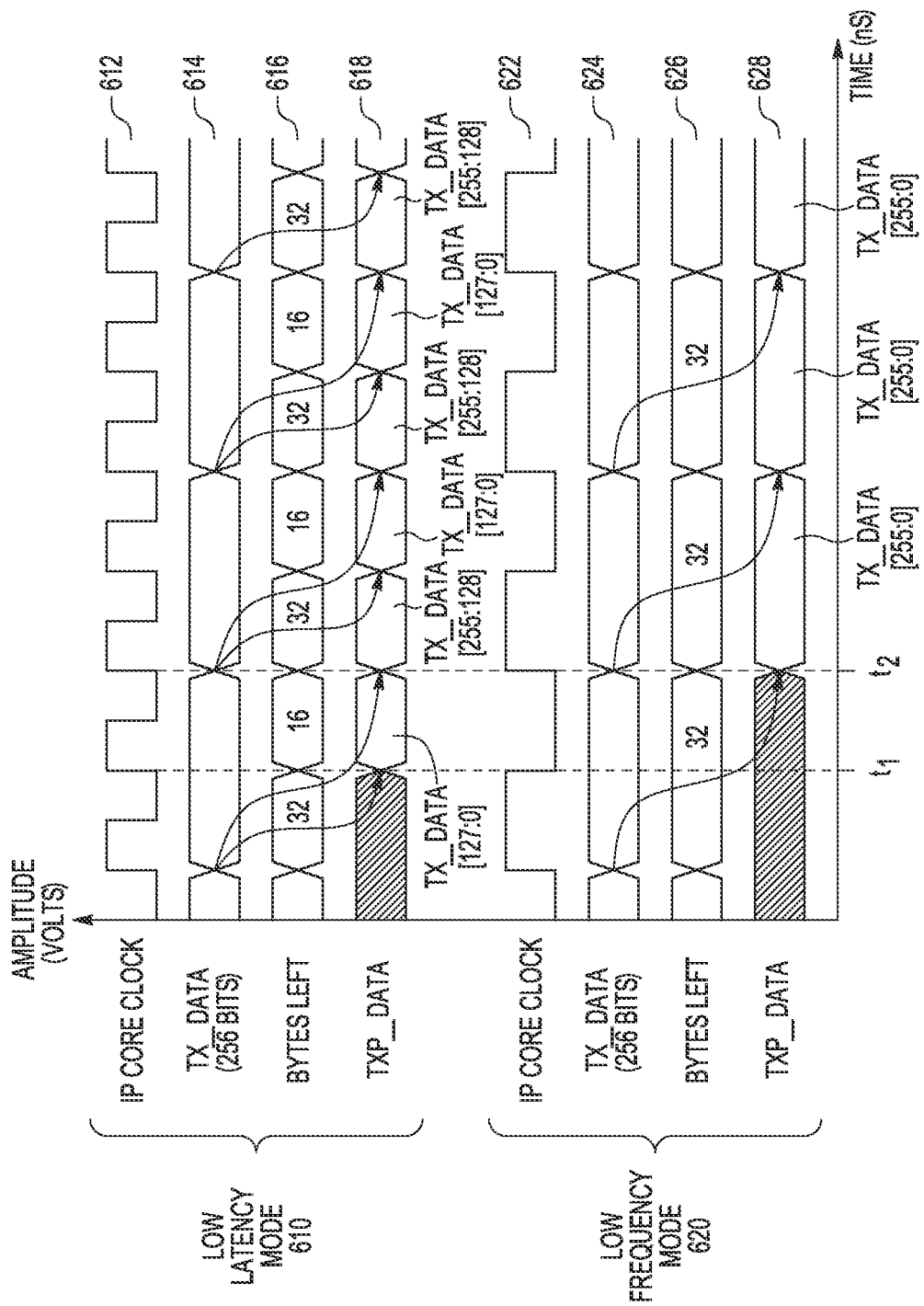
FIG. 6 illustrates a timing diagram useful in understanding the operation of the transmit blocks of the communications controller of FIG. 5 according to some embodiments.

FIG. 6 illustrates a timing diagram 600 useful in understanding the operation of the transmit blocks of communications controller 500 of FIG. 5 according to some embodiments. The horizontal axis represents time in nanoseconds (ns), and the vertical axis represents the amplitude of various signals in volts. Timing diagram 600 illustrates two sets of four waveforms of interest, a set 610 for low latency mode and a set 620 for low frequency mode. Set 610 includes a waveform 612 for a clock labeled "IP Core Clock", a waveform 614 for transmit data provided by transmit block 520 labeled "TX_DATA", a waveform 616 labeled "BYTES LEFT", and a waveform 618 for transmit data received by serializer 530 labeled "TXP_DATA". Set 620 includes waveforms 622, 624, 626, and 628 for the same signals in corresponding waveforms 612, 614, 616, and 618. The horizontal axis illustrates two particular time points of interest labeled "$t_1$" and "$t_2$".

In operation, in low latency mode physical interface 540 provides the IP Core Clock at a particular frequency, such as 1.0 GHz clock for PCIE 3.0 data rates, to the components of communications controller 500. Transmit block 520 receives data from client interface 510 over a 256-bit data path and provides 256 data bits to link controller 580 every two IP Core Clock cycles. In some embodiments, the transmit block 520 provides 256 data bits to link controller 580 every IP Core Clock cycle, and that data is throttled back to an average of 256 bits every two IP Core Clock cycles. Link controller 580 provides 128 data bits (one symbol per lane) to serializer 530 every IP Core Clock cycle. Before time $t_1$, link controller 580 has 32 bytes*8=256 bits left to provide to serializer 530. Link controller 580 provides the lower 128 of 256 data bits to serializer 530 over the lower half (bits 127:0) of the expanded 256-bit bus during a first cycle of the IP Core Clock, and the upper 128 of 256 data bits to serializer 530 over the lower half (bits 127:0) of the expanded 256-bit bus during a second cycle of the IP Core Clock. Serializer 530 outputs an aggregate of 128 bits of data each cycle of the IP Core Clock using, for example, the 128b/130b encoding scheme, at one bit per each of 16 lanes at the 8.0 GT/s PCIE 3.0 data rate.

In low frequency mode, physical interface 550 provides the IP Core Clock at half the frequency as for low latency mode, such as 500 MHz for PCIE 3.0 data rates, to the components of communications controller 500. Transmit block 520 receives data from client interface 510 over a 256-bit data path and provides 256 data bits to link controller 580 every IP Core Clock cycle (500 MHz in this mode). Link controller 580 provides 256 data bits (two symbols) to serializer 530 every IP Core Clock cycle. Before time $t_1$, link controller 580 has 32 bytes*8=256 bits left to provide to serializer 530. Link controller 580 provides 256 data bits to serializer 530 over both halves (bits 255:0) of the expanded 256-bit bus during each cycle of the IP Core Clock. Serializer 530 outputs an aggregate of 256 bits of data each cycle of the IP Core Clock using, for example, the 128b/130b encoding scheme, at one bit per each of 16 lanes at the 8.0 GT/s PCIE 3.0 data rate. Latency through communications controller 500 is half the size in low latency mode as it is in low frequency mode.

Figure 7:
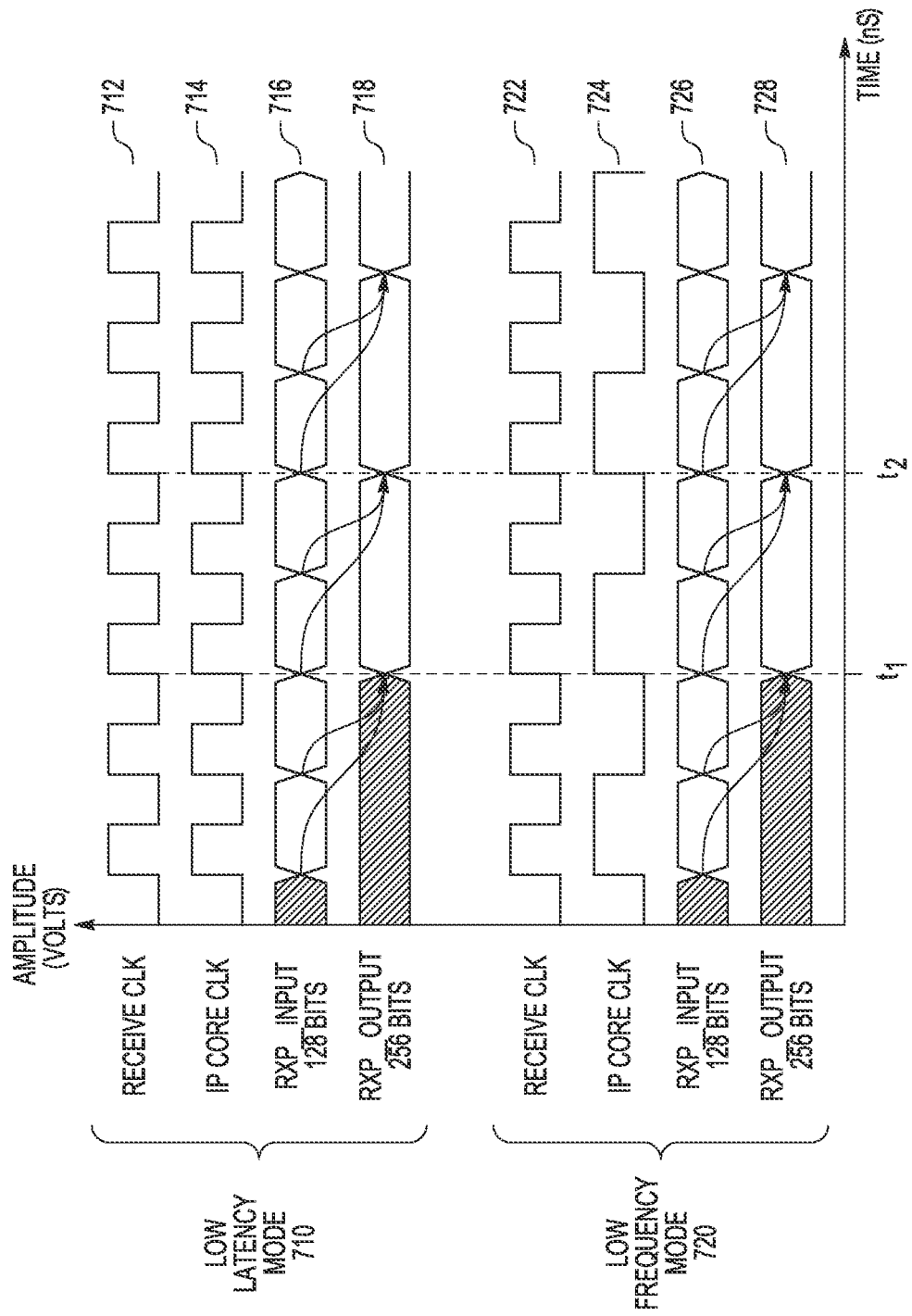
FIG. 7 illustrates a timing diagram useful in understanding the operation of the receive blocks of the communications controller of FIG. 5 according to some embodiments.

FIG. 7 illustrates a timing diagram 700 useful in understanding the operation of the receive blocks of communications controller 500 of FIG. 5 according to some embodiments. The horizontal axis represents time in ns, and the vertical axis represents the amplitude of various signals in volts. Timing diagram 700 illustrates two sets of four waveforms of interest, a set 710 for low latency mode, and a set 720 for low frequency mode. Set 710 includes a waveform 712 for a clock labeled "Receive Clock", a waveform 714 for the IP Core CLK, a waveform 716 for receive data gathered by deserializer 560 labeled "RXP_INPUT", and a waveform 718 for receive data output by deserializer 560 labeled "RXP_OUTPUT". Set 720 includes waveforms 722, 724, 726, and 728 for the same signals as in corresponding waveforms 622, 624, 626, and 628. The horizontal axis illustrates two particular time points of interest labeled $t_1$ and $t_2$.

In operation, in low latency mode 710, physical interface 540 provides both the Receive Clock and the IP Core Clock at a particular frequency, such as 1.0 GHz clock for PCIE 3.0 data rates, to the components of communications controller 500. Deserializer 560 receives from physical interface 540 an aggregate of 128 bits of data each Receive Clock cycle using, for example, the 128b/130b decoding scheme, at one bit per each of 16 lanes at the 8.0 GT/s PCIE 3.0 data rate. Deserializer 560 constructs a symbol each Receive Clock cycle, but transfers two symbols at around time $t_1$ using the expanded 256-bit internal bus to receive block 570 every two cycles of the IP Core Clock, and repeats the process every cycle of IP Core Clock such as at around time $t_2$. A data valid signal is sent with the data to indicate which clock edge of the IP Core Clock 714 the receive block 570 is to capture the data.

In low frequency mode 720, physical interface 540 provides the Receive Clock and the IP Core Clock at half the frequency as for low latency mode, such as 500 MHz clock for PCIE 3.0 data rates, to the components of communications controller 500. Deserializer 560 receives from physical interface 540 an aggregate of 256 bits of data each Receive Clock cycle using, for example, the 128b/130b decoding scheme, at one bit per each of 16 lanes at the 8.0 GT/s PCIE 3.0 data rate. Deserializer 560 constructs two symbols each Receive Clock cycle, and again transfers two symbols at around time $t_1$ using the expanded 256-bit internal bus to receive block 570 every cycle of the IP Core Clock, and repeats the process every cycle of IP Core Clock such as at around time $t_2$. Note that the transfers between deserializer 560 and receive block 570 use the same, 256-bit expanded bus and using the half clock frequency.

Figure 8:
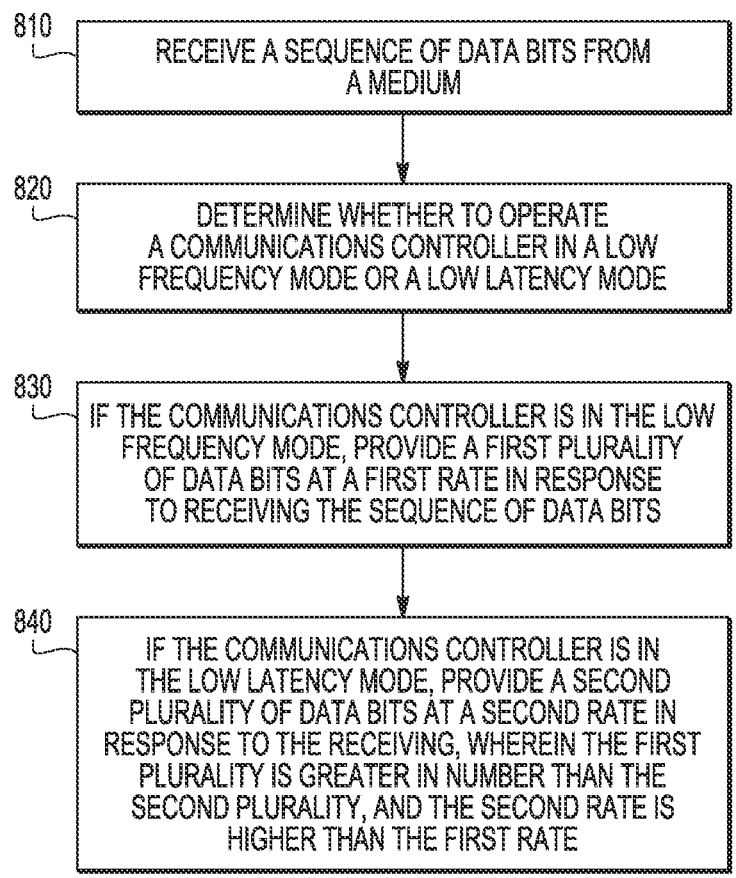
FIG. 8 illustrates a flow diagram of a method for configuring the communications controller of FIG. 5 according to some embodiments.

FIG. 8 illustrates a flow diagram of a method 800 for configuring communications controller 500 of FIG. 5 according to some embodiments. Action box 810 includes receiving a sequence of data bits from a communication medium. Action box 820 includes determining whether to operate a communications controller in a low frequency mode or a low latency mode. Action box 830 includes determining if the communications controller is in the low frequency mode and providing a first multiple number of data bits at a first rate in response to receiving the sequence of data bits. Action box 840 includes determining if the communications controller is in the low latency mode and providing a second multiple number of data bits at a second rate in response to receiving the sequence of data bits, where the first multiple number is greater than the second multiple number, and the second rate is higher than the first rate.

By providing concurrent support for a first multiple number of data bits at a first rate in a low frequency mode and a second multiple number of data bits at a second rate in a low latency mode, where the first multiple number of data bits is greater in number than the second multiple number, and the second rate is higher than the first rate, and by further selectively using some or all of the internal data path width, efficient low latency and low frequency transactions meet performance demands of, for example, graphics processors, CPUs, and southbridges. Also, the internal architecture receive and transmit circuits designed to operate in, for example, a PCIE 3.0 data rate environment can also operate well in a PCIE 4.0 data rate environment. Thus, communications controller 500 significantly saves redesign effort, power consumption, and silicon area for the internal functional circuits, while taking advantage of ever increasing capabilities of communication standards.

The functions of FIGS. 1-5, for example, communications controllers 232, 262, 420, and 500 may be implemented with various combinations of hardware and software. Some of the software components may be stored in a computer readable storage medium for execution by at least one processor. Moreover the method illustrated in FIG. 8 may also be governed by instructions that are stored in a computer readable storage medium and that are executed by at least one processor. Each of the operations shown in FIG. 8 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, the functions of FIGS. 1-5 may be described or represented by a computer accessible data structure in the form of a database or other data structure which can be read by a program and used, directly or indirectly, to fabricate integrated circuits with the circuits of FIGS. 1-5. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising integrated circuits with the circuits of FIGS. 1-5. The netlist may then be placed and routed to produce a data set describing geometric shapes to be applied to masks. The masks may then be used in various semiconductor fabrication steps to produce integrated circuits of FIGS. 1-5. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, in the illustrated examples, computer system 200, graphics processor 300, southbridge 400, and communications controller 500 have been described as having certain architectures, but in some embodiments each one could have various architectures.

Also, in the illustrated examples, computer system 200, graphics processor 300, southbridge 400, and communications controller 500 are described in the context of the PCIE standard, but in some embodiments each function could be described in the context of a different standard that describes a different communications protocol. In some embodiments, computer system 200 could include other types of functional circuits such as an accelerated processing unit (APU), a digital signal processor (DSP), and the like, and the other types of functional circuits may or may not include at least one communications controller. Also, each one of functional circuits of FIGS. 1-5 could be formed on a single integrated circuit or could be formed on multiple integrated circuits.

Accordingly, it is intended by the appended claims to cover all modifications of the disclosed embodiments that fall within the scope of the disclosed embodiments.

What is claimed is:

1. A communications controller comprising:
    a physical interface having a port for connection to a communication medium, and an output, and operating according to a protocol to provide a sequence of data bits with a first number of data bits to said output;
    a deserializer having an input coupled to said output of said physical interface, and an output for providing, in response to said sequence of data bits, a first plurality of data bits at a first rate in a low frequency mode until said first number of data bits is provided and a second plurality of data bits at a second rate in a low latency mode until said first number of data bits is provided, wherein said first plurality is greater in number than said second plurality, and said second rate is higher than said first rate; and
    a receive block having an input coupled to said output of said deserializer, and an output.

2. The communications controller of claim 1 wherein said protocol comprises a standard known as the Peripheral Component Interconnect Express (PCIE) standard.

3. The communications controller of claim 2 wherein said port comprises sixteen PCIE data lanes.

4. The communications controller of claim 2 wherein said first plurality of bits comprises a third plurality of PCIE symbols.

5. The communications controller of claim 4 wherein said deserializer forms said third plurality of PCIE symbols using a selected one of 8b/10b encoding and 128b/130b encoding.

6. The communications controller of claim 1 wherein:
    the communications controller further comprises a serializer having an input and an output, and a link controller;
    said physical interface further has an input coupled to said output of said serializer;
    said deserializer further has an output; and
    said link controller further has an input coupled to said output of said deserializer, and an output coupled to said input of said serializer, and is configured to:
        control said serializer, physical interface, and deserializer to determine a link speed, and
        determine said first rate and said second rate according to said link speed.

7. The communications controller of claim 1 further comprising:
    a link controller coupled to said deserializer, wherein said link controller comprises at least one mode register for selecting one of said low frequency mode and said low latency mode.

8. The communications controller of claim 7 wherein:
    said at least one mode register comprises a plurality of mode registers for selecting one of said low frequency mode and said low latency mode for each of a corresponding plurality of link speeds.

9. The communications controller of claim 1 further comprising:
    a client interface having an input coupled to said output of said receive block, and a port.

10. A communications controller comprising:
    a transmit block having an input and an output for providing a sequence of a plurality of symbols with a first number of data bits;
    a serializer having an input coupled to said output of said transmit block, and an output for providing, in response to said sequence of said plurality of symbols, a first plurality of data bits at a first rate in a low frequency mode until said first number of data bits is provided and a second plurality of data bits at a second rate in a low latency mode until said first number of data bits is provided, wherein said first plurality is greater in number than said second plurality, and said second rate is higher than said first rate; and
    a physical interface having an input coupled to said output of said serializer, and a port for connection to a communication medium, and configured to operate according to a protocol to provide a sequence of data bits.

11. The communications controller of claim 10 wherein said protocol comprises a standard known as the Peripheral Component Interconnect Express (PCIE) standard.

12. The communications controller of claim 11 wherein said port comprises sixteen PCIE data lanes.

13. The communications controller of claim 11 wherein said first plurality of bits comprises a third plurality of PCIE symbols.

14. The communications controller of claim 13 wherein said serializer provides one of said first plurality of data bits and said second plurality of data bits to said physical interface using a selected one of 8b/10b encoding and 128b/130b encoding.

15. The communications controller of claim 10 wherein:
    the communications controller further comprises a deserializer having an input and an output, and a link controller;
    said physical interface further has an output coupled to said input of said deserializer;
    said serializer further has an output; and
    said link controller is further coupled between said transmit block and said serializer, and is configured to:
        control said serializer, physical interface, and deserializer to determine a link speed, and
        determine said first rate and said second rate according to said link speed.

16. The communications controller of claim 10 further comprising:
    a link controller coupled to said serializer, wherein said link controller comprises at least one mode register for selecting one of said low frequency mode and said low latency mode.

17. The communications controller of claim 16 wherein:
    said at least one mode register comprises a plurality of mode registers for selecting one of said low frequency mode and said low latency mode for each of a corresponding plurality of link speeds.

18. The communications controller of claim 10 further comprising:
    a client interface having an output coupled to said input of said transmit block, and a port.

19. A communications controller comprising:
a physical interface having a port for connection to a communication medium, an input, and an output, and configured to operate according to a protocol to receive a first sequence of data bits with a first number of data bits from said input and to transmit said first sequence of data bits to said port, and to receive a second sequence of data bits with said first number of data bits from said port and to conduct said second sequence of data bits to said output; and
an internal transmit and receive circuit coupled to said input and said output of said physical interface, having an internal architecture to conduct a first plurality of symbols at a first rate in a low frequency mode until said first number of data bits is provided and a second plurality of symbols at a second rate in a low latency mode until said first number of data bits is provided, wherein said first plurality is greater in number than said second plurality, and said second rate is higher than said first rate.

20. The communications controller of claim 19 wherein said protocol comprises a standard known as the Peripheral Component Interconnect Express (PCIE) standard.

21. The communications controller of claim 19 wherein said port comprises sixteen PCIE data lanes.

22. The communications controller of claim 19 wherein said first plurality of symbols comprises a plurality of PCIE symbols.

23. The communications controller of claim 22 wherein said internal transmit and receive circuit forms said plurality of PCIE symbols using a selected one of 8b/10b encoding and 128b/130b encoding.

24. The communications controller of claim 19 wherein said internal transmit and receive circuit comprises:
a serializer having an input and an output;
a deserializer having an input and an output; and
a link controller,
wherein said physical interface further has an input coupled to said output of said serializer, and an output coupled to said input of said deserializer; and
wherein said link controller further has an input coupled to said output of said deserializer, and an output coupled to said input of said serializer, and is configured to:
control said serializer, said physical interface, and said deserializer to determine a link speed, and
determine said first rate and said second rate according to said link speed.

25. The communications controller of claim 19 wherein said internal transmit and receive circuit comprises:
a link controller comprising at least one mode register for selecting one of said low frequency mode and said low latency mode.

26. The communications controller of claim 25 wherein:
said at least one mode register comprises a plurality of mode registers for selecting one of said low frequency mode and said low latency mode for each of a corresponding plurality of link speeds.

27. The communications controller of claim 19 wherein said internal transmit and receive circuit comprises a client interface having a port.

28. A method comprising:
when a communications controller is operating in a low frequency mode, providing a first number of data bits by providing a first plurality of data bits at a first rate until said first number of data bits is provided; and
when said communications controller is operating in a low latency mode, providing said first number of data bits by providing a second plurality of data bits at a second rate until said first number of data bits is provided, wherein said first plurality is greater in number than said second plurality, and said second rate is higher than said first rate.

29. The method of claim 28 further comprising:
receiving a sequence of data bits from a communication medium; and
determining whether to operate said communications controller in said low frequency mode or said low latency mode.

30. The method of claim 28 further comprising:
outputting said first plurality of data bits in said low latency mode and said second plurality of data bits in said low frequency mode to a client interface.

31. The method of claim 30 wherein said providing said first plurality of data bits at said first rate comprises providing said first plurality of data bits at said first rate from a deserializer to a receive block.

32. The method of claim 28 further comprising:
determining a link speed for said communications controller.

33. The method of claim 32 further comprising determining said first and second rates in response to said link speed.

34. A communications system comprising:
a communications controller having a physical interface, and an internal transmit and receive circuit coupled to said physical interface, having an internal architecture to conduct a first plurality of symbols at a first rate in a low frequency mode until a first number of data bits is provided and a second plurality of symbols at a second rate in a low latency mode until said first number of data bits is provided, wherein said first plurality is greater in number than said second plurality, and said second rate is higher than said first rate;
a communication medium coupled to said physical interface of said communications controller; and
a device coupled to said communication medium.

35. The communications system of claim 34 further comprising a client, wherein said communications controller further includes a client interface coupled between said internal transmit and receive circuit, and said client.

36. The communications system of claim 34 wherein said communications controller and said device operate according to a standard known as the Peripheral Component Interconnect Express (PCIE) standard.

37. The communications system of claim 36 wherein said first plurality of symbols comprises a plurality of PCIE symbols.

38. The communications system of claim 37 wherein said internal transmit and receive circuit forms said plurality of PCIE symbols using a selected one of 8b/10b encoding and 128b/130b encoding.

39. The communications system of claim 34 wherein said internal transmit and receive circuit comprises:
a serializer having an input and an output;
a deserializer having an input and an output; and
a link controller,
wherein said physical interface further has an input coupled to said output of said serializer, and an output coupled to said input of said deserializer; and
wherein said link controller further has an input coupled to said output of said deserializer, and an output coupled to said input of said serializer, and is configured to:
control said serializer, said physical interface, and said deserializer to determine a link speed, and determine said first rate and said second rate according to said link speed.

\* \* \* \* \*